(No Model.)

W. GIBSON & R. RAY.
APPARATUS FOR SHAVING BARRELS, &c.

No. 401,550. Patented Apr. 16, 1889.

WITNESSES:
Th. Rollé
Jas. P. Kelly

INVENTORS:
Wm Gibson
Robert Ray
BY John A. Diederostein
ATTORNEY.

UNITED STATES PATENT OFFICE.

WILLIAM GIBSON AND ROBERT RAY, OF PHILADELPHIA, PENNSYLVANIA.

APPARATUS FOR SHAVING BARRELS, &c.

SPECIFICATION forming part of Letters Patent No. 401,550, dated April 16, 1889.

Application filed April 8, 1887. Serial No. 234,131. (No model.)

*To all whom it may concern:*

Be it known that we, WILLIAM GIBSON and ROBERT RAY, citizens of the United States, residing in the city and county of Philadelphia, State of Pennsylvania, have invented a new and useful Improvement in Apparatus for Shaving or Grinding Barrels, &c., which improvement is fully set forth in the following specification and accompanying drawings.

Our invention consists of an apparatus for shaving or grinding barrels, &c., in a rapid and expeditious manner, the same embracing novel features, as will be hereinafter fully set forth and claimed.

Figure 1:
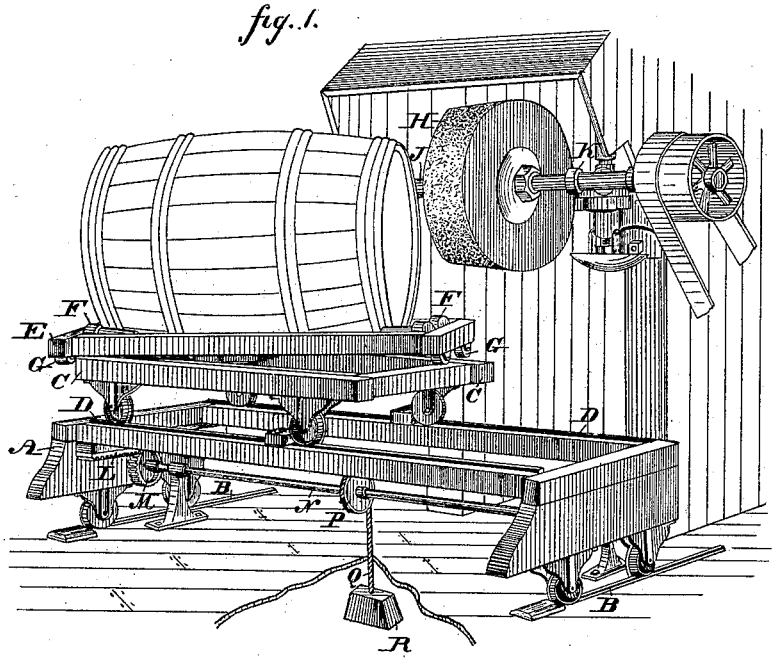
Figure 2:
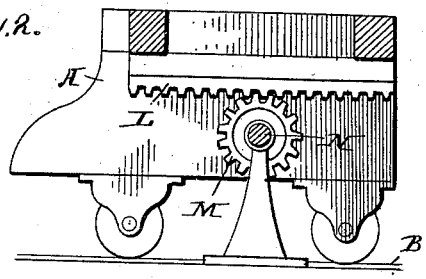
Figure 3:
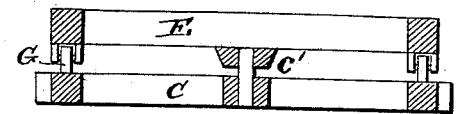

Figure 1 represents a perspective view of an apparatus embodying our invention. Fig. 2 represents a vertical sectional view of the lower truck, showing the neck and the intermeshing pinion. Fig. 3 represents a sectional view of the cradle located on the upper truck, showing the pivotal pin thereof.

Similar letters of reference indicate corresponding parts in all the figures.

Referring to the drawings, A represents a truck, which is mounted on tracks B, the latter being secured to the floor of the workshop.

C represents a truck, which is mounted on tracks D, the latter being secured to the top of the truck A at a right angle to the track B.

E represents a cradle, which is located above the truck C and centrally pivoted thereto, said pivotal connection being preferably formed of a pin, C', inserted in cross-bars on said cradle E and truck C, as shown in Fig. 3, adapted to support a barrel, keg, &c., to be shaved, said cradle having mounted on its ends the rollers F on which the barrel, &c., are rested and which permit the barrel, &c., to be conveniently rolled around on the cradle. The under side of the cradle has wheels G, which run on the truck C, whereby the cradle may be rotated with ease on said truck.

H represents a grinding-wheel, which is connected with a shaft, J, the latter being mounted in bearings K and receiving power in any manner, it being noticed that said wheel H is located in such position that a barrel, &c., placed on the cradle may be presented to it. The said wheel has a roughened peripheral surface, whereby the barrel may be readily ground, or, as it is called, "shaved."

To the under side of the truck A are secured racks L, which are parallel with the tracks B, and gearing with said racks are pinions M, which are connected with a shaft, N, whose bearings are on the floor. Secured to the shaft N is a pulley, P, around which is wound a rope, Q, the lower end whereof carries a weight, R.

The operation is as follows: A barrel, &c., are placed on the cradle, and owing to the action of the weight, cord, pulley, racks, and pinions, as above described, the truck A is drawn toward the grinding-wheel H and under the same. The barrel, &c., are now advanced against the wheel by moving the truck C, the cradle G, and truck A, and, as the rotary motions of the cradle are independent of the right-angular motions of said trucks C A, it is evident that every part of the exterior surface of the barrel, &c., may be subjected to the shaving or grinding action of the wheel. The truck A is then run back and the barrel, &c., removed, after which another barrel, &c., are placed on the cradle and said truck returns to its first position.

Having thus described our invention, what we claim as new, and desire to secure by Letters Patent, is—

1. In a barrel-grinding device, the shaft N, suitably mounted on standards adapted to be secured to a floor, in combination with the pinions M and pulley P, mounted on said shaft, the weighted cord Q, secured to said pulley, the truck A, having racks L on its under face, the track B, the truck C on truck A and adapted to move at right angles to track B, the cradle E, pivoted to the truck C, and a grinding-wheel, with means, substantially as described, for operating the same, substantially as described.

2. In a barrel-grinding device, a truck having means for automatically moving the same, a second truck mounted on the first truck and adapted to move thereon at right angles to the direction of movement of the first truck, a cradle centrally pivoted to said second truck and provided with the wheels G, and the rollers F, the latter journaled in said cradle at the ends thereof and having the barrel to be operated on resting thereon, substantially as described.

3. In an apparatus for grinding barrels, &c., the truck A, having a rack connected therewith, in combination with a pinion mounted on the floor, a pulley on the pinion-shaft, and a weighted cord connected with said pulley, substantially as described.

WM. GIBSON.
ROBERT RAY.

Witnesses:
 JOHN A. WIEDERSHEIM,
 A. P. JENNINGS.